(12) United States Patent
Sheidler et al.

(10) Patent No.: US 11,674,589 B2
(45) Date of Patent: Jun. 13, 2023

(54) VEHICLE WITH GEAR AND HYDRAULIC COOLING SYSTEM

(71) Applicant: Deere & Company, Moline, IL (US)

(72) Inventors: Alan D. Sheidler, Moline, IL (US); Curt A. Elpers, Coal Valley, IL (US); Ryan S. Herlyn, Port Byron, IL (US)

(73) Assignee: Deere & Company, Moline, IL (US)

( * ) Notice: Subject to any disclaimer, the term of this patent is extended or adjusted under 35 U.S.C. 154(b) by 651 days.

(21) Appl. No.: 16/557,443

(22) Filed: Aug. 30, 2019

(65) Prior Publication Data

US 2021/0062909 A1    Mar. 4, 2021

(51) Int. Cl.
| | |
|---|---|
| *F16H 57/04* | (2010.01) |
| *B60K 11/02* | (2006.01) |
| *F01P 7/14* | (2006.01) |
| *F15B 21/0423* | (2019.01) |
| *F01P 7/16* | (2006.01) |
| *F01P 5/10* | (2006.01) |

(52) U.S. Cl.
CPC .......... *F16H 57/0416* (2013.01); *B60K 11/02* (2013.01); *F01P 7/165* (2013.01); *F15B 21/0423* (2019.01); *F16H 57/0412* (2013.01); *F16H 57/0417* (2013.01); *F16H 57/0436* (2013.01); *F16H 57/0441* (2013.01); *F16H 57/0467* (2013.01); *F01P 2005/105* (2013.01)

(58) Field of Classification Search
CPC .. F16H 57/0412; F16H 57/04; F16H 57/0436; F16H 57/0467; F16H 57/0413; F16H 57/0441; F16H 57/0417; F16H 61/4165; B60K 11/02; B60K 11/06; F15B 21/0423; F15B 2211/62; B60Y 2200/222; A01D 69/03; F01P 7/165; F01P 7/14; F01P 2005/105
See application file for complete search history.

(56) References Cited

U.S. PATENT DOCUMENTS

| | | |
|---|---|---|
| 9,487,075 B2 | 11/2016 | De Lathauwer et al. |
| 9,597,951 B2 | 3/2017 | Alm et al. |
| | (Continued) | |

OTHER PUBLICATIONS 9400, 9500, SideHill 9500 and 9600 MAXIMIZER Combines Diagnostics and Repair Technical Manual, 1997.

*Primary Examiner* — Keith J Frisby
(74) *Attorney, Agent, or Firm* — Michael Best & Friedrich LLP

(57) ABSTRACT

A vehicle includes a frame, at least one traction device coupled to the frame for facilitating movement of the vehicle, an implement coupled to the frame and configured to perform a work operation, a gearbox, a hydraulic system having a hydraulic reservoir, and an oil cooling system configured to cool the gearbox and the hydraulic system. The oil cooling system includes first and second circuits for a cooling oil, and a crossover circuit. The first circuit includes the gearbox and a first oil-to-air cooler configured to cool the cooling oil from the gearbox. The second circuit includes the hydraulic reservoir and a second oil-to-air cooler for cooling the cooling oil from the hydraulic reservoir. The crossover circuit includes the gearbox and the hydraulic reservoir and is configured to exchange the cooling oil between the gearbox and the hydraulic reservoir to provide heat transfer between the first and second circuits.

16 Claims, 3 Drawing Sheets

(56) References Cited

U.S. PATENT DOCUMENTS

2003/0029167 A1* 2/2003 Hudson ................. F01P 11/029
  60/599
2005/0178348 A1* 8/2005 Werner ............... F02B 29/0443
  123/41.33

\* cited by examiner

VEHICLE WITH GEAR AND HYDRAULIC COOLING SYSTEM

BACKGROUND

The present disclosure relates to a cooling system for a vehicle such as an agricultural harvester. More specifically, the present disclosure relates to a cooling system for cooling a gearbox and a hydraulic system. Typically, two independent cooling systems are employed for the gearbox and hydraulic systems, each having its own cooler and plumbing.

SUMMARY

In one aspect, the disclosure provides a vehicle. The vehicle includes a frame, at least one traction device coupled to the frame for facilitating movement of the vehicle, an implement coupled to the frame and configured to perform a work operation, a gearbox, a hydraulic system having a hydraulic reservoir, and an oil cooling system configured to cool the gearbox and the hydraulic system. The oil cooling system includes a first circuit for a cooling oil, a second circuit for the cooling oil, and a crossover circuit. The first circuit includes the gearbox and a first oil-to-air cooler configured to cool the cooling oil from the gearbox. The second circuit includes the hydraulic reservoir and a second oil-to-air cooler for cooling the cooling oil from the hydraulic reservoir. The crossover circuit includes the gearbox and the hydraulic reservoir and is configured to exchange the cooling oil between the gearbox and the hydraulic reservoir to provide heat transfer between the first and second circuits.

In another aspect, the disclosure provides a cooling system for a vehicle, the vehicle including a gearbox and a hydraulic system. The cooling system includes a first circuit for a coolant configured to cool the gearbox, a second circuit for the coolant configured to cool the hydraulic system, and a crossover circuit. The first circuit includes the gearbox and a first cooler configured to cool the coolant from the gearbox. The second circuit includes a hydraulic reservoir for the hydraulic system and a second cooler configured to cool the coolant from the hydraulic reservoir. The crossover circuit includes the gearbox and the hydraulic reservoir, the crossover circuit configured to exchange the coolant between the gearbox and the hydraulic reservoir to provide heat transfer between the first and second circuits.

In another aspect, the disclosure provides a vehicle system including a vehicle and a cooling system. The vehicle includes a first heat generating system and a second heat generating system. The cooling system is configured to cool the first heat generating system and the second heat generating system. The cooling system includes a first circuit for a coolant, and a second circuit for the coolant. The first circuit is configured to transfer heat from the first heat generating system to a first cooler configured to cool the coolant. The second circuit is configured to transfer heat from the second heat generating system to a second cooler configured to cool the coolant. The first and second circuits are in fluid communication with each other for crossover circulation of the coolant therebetween.

Other aspects of the disclosure will become apparent by consideration of the detailed description and accompanying drawings.

DETAILED DESCRIPTION

Before any implementations of the disclosure are explained in detail, it is to be understood that the disclosure is not limited in its application to the details of construction and the arrangement of components set forth in the following description or illustrated in the accompanying drawings. The disclosure is capable of supporting other implementations and of being practiced or of being carried out in various ways. The term "about" used herein is intended to be given its plain and ordinary meaning, e.g., "approximately".

Figure 1:
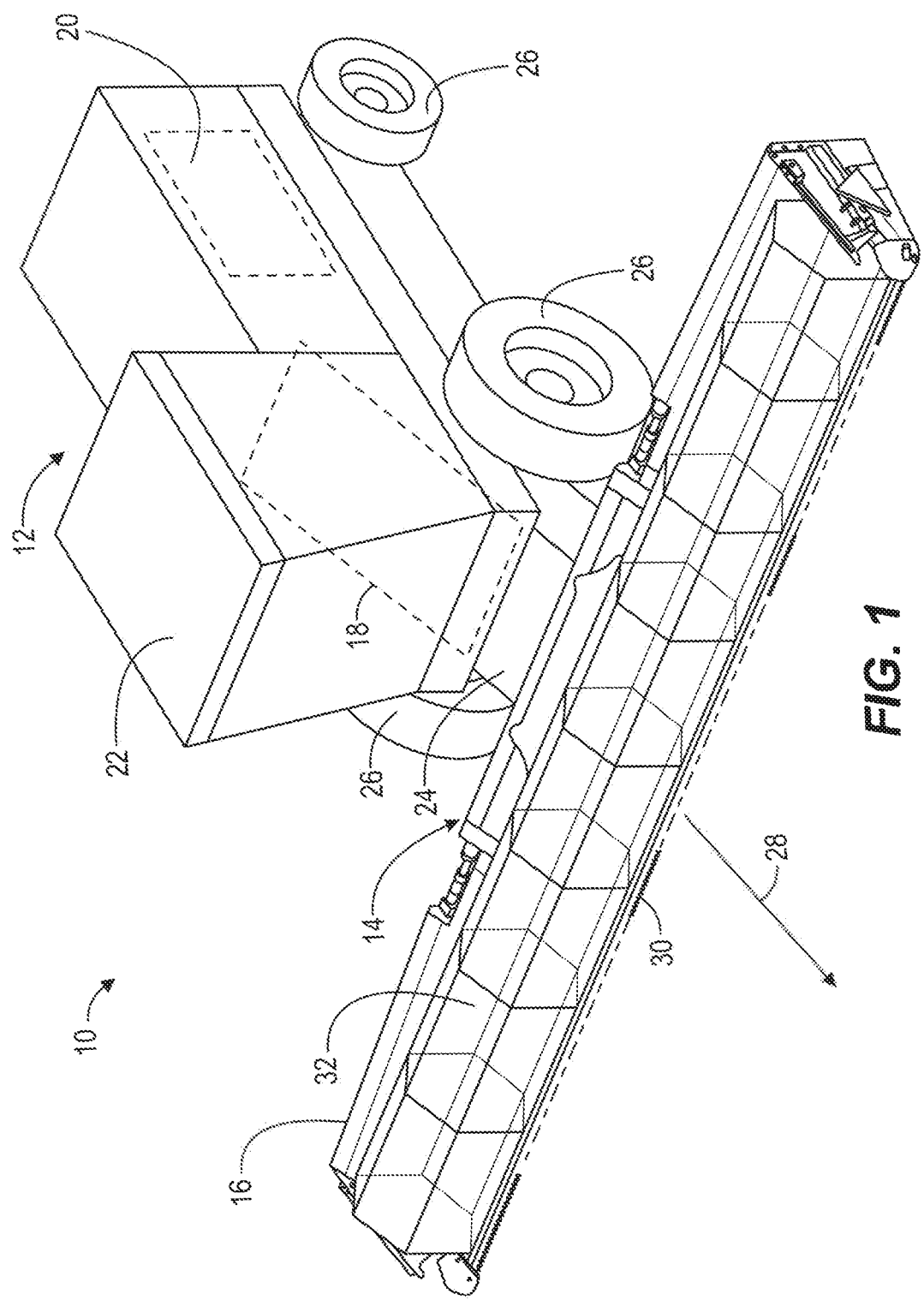
FIG. 1 is a perspective view of a harvester.

FIG. 1 illustrates a vehicle system 10 including a vehicle 12 according to one implementation. While the illustrated vehicle 12 is shown as a combine harvester, in other implementations, the vehicle 12 can be any suitable machine or device, such as other agricultural vehicles, construction vehicles, or other vehicles having an implement, etc. The vehicle 12 includes at least one implement 14 for performing a work operation. In the illustrated implementation, the vehicle 12 includes implements such as a harvesting platform 16 and a separator 18 for harvesting and separating a crop, respectively. In other implementations, the at least one implement 14 may include other devices, such as buckets, blades, cutters, etc. for agricultural applications, construction applications, and other applications requiring a work operation.

The illustrated vehicle 12 includes the harvesting platform 16, the separator 18, a prime mover 20 such as an engine, a cab 22, a feeder house 24, and at least one traction device 26. The prime mover 20 is configured to move the vehicle 12 in a direction of travel 28 via the at least one traction device 26. The illustrated at least one traction device 26 includes wheels, but one or more continuous tracks or another suitable traction device for facilitating movement along a support surface may be utilized.

The harvesting platform 16 includes a cutter bar 30 that is configured to cut crop being harvested, and a reel 32 that is configured to press the crop against the cutter bar 30 to thereby cut the crop.

The vehicle system 10 also includes a gearbox 34 such as a main engine gearbox, a hydraulic system 36, and a cooling system 38 for cooling the main engine gearbox 34 and the hydraulic system 36. In other implementations, the gearbox 34 being cooled may be another type of gearbox besides the main engine gearbox, such as any engine gearbox or other drive gearbox. In yet other implementations, the main engine gearbox 34 and the hydraulic system 36 may each be any type of heat generating system configured to be cooled by the cooling system 38. In the illustrated implementation, the cooling system 38 is an oil cooling system employing oil as a coolant. The oil is also a lubricant for the main engine gearbox 34 and the fluid for the hydraulic system 36. In other implementations, other types of cooling systems having other types of coolants may be employed.

Figure 2:
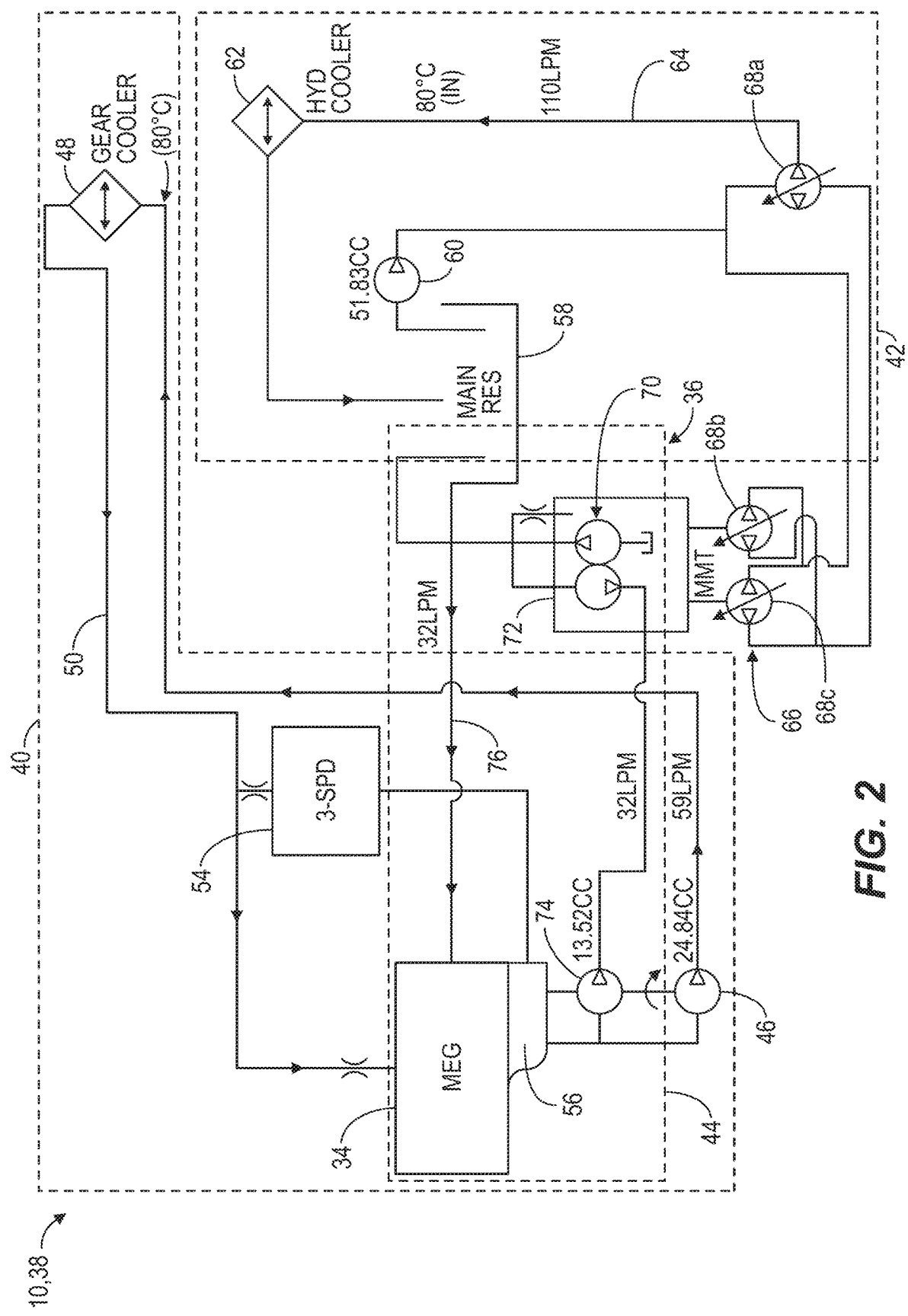
FIG. 2 is a schematic cooling system diagram of the harvester of FIG. 1.

FIG. 2 illustrates the cooling system 38, which includes a gearbox cooling circuit 40, a hydraulic cooling circuit 42, and a crossover circuit 44.

The gearbox cooling circuit 40 includes the main engine gearbox 34, a gearbox cooling pump 46, and a gearbox cooler 48 all fluidly coupled in a continuous loop by way of a series of conduits 50. The gearbox cooling pump 46 is disposed downstream of the main engine gearbox 34 before the gearbox cooler 48 and is configured to draw coolant from the main engine gearbox 34. The gearbox cooling pump 46 may have a flow capacity of up to about 16 gallons per minute (59 liters per minute), but may be higher or lower in other implementations. The gearbox cooling pump 46 in the illustrated construction is a fixed displacement one rotation pump, but may have another configuration in other implementations. For example, the displacement may be about 1.52 cubic inches (24.84 cubic centimeters), but may be higher or lower in other implementations.

The gearbox cooler 48 is disposed downstream of the gearbox cooling pump 46 before the main engine gearbox 34. The gearbox cooler 48 is an oil-to-air cooler in the illustrated implementation but may be another type of cooler in other implementations. Specifically, the gearbox cooler 48 is a heat exchanger containing oil that is cooled by external airflow from a fan 52 (FIG. 3) such as an engine cooling fan or other fan in other implementations. The gearbox cooler 48 is configured to provide cooled coolant to the main engine gearbox 34. Thus, the gearbox cooling circuit 40 is configured to cool the main engine gearbox 34.

A rotor drive gearbox 54, such as a rotor drive three-speed gearbox, is disposed in parallel between the gearbox cooler 48 and the main engine gearbox 34. The rotor drive gearbox 54 is configured to receive cooled coolant from the gearbox cooler 48 in parallel with the main engine gearbox 34. The rotor drive gearbox 54 is configured to provide coolant downstream to the main engine gearbox 34, specifically to a gearbox reservoir 56 containing hot coolant. Thus, the rotor drive gearbox 54 is also cooled. In other constructions, the rotor drive gearbox 54 may be another type of gearbox, or another heat generating system.

The hydraulic cooling circuit 42 includes a hydraulic reservoir 58 for the hydraulic system 36, a hydraulic cooling pump 60, and a hydraulic cooler 62 all fluidly coupled in a continuous loop by way of a series of conduits 64. The hydraulic reservoir 58 is an open reservoir (e.g., vented and unpressurized). The hydraulic cooling pump 60 is disposed downstream of the hydraulic reservoir 58 before the hydraulic cooler 62, and the hydraulic cooling pump 60 is configured to draw coolant from the hydraulic reservoir 58. The hydraulic cooling pump 60 may have a flow capacity of about 29 gallons per minute (110 liters per minute), but may be higher or lower in other implementations. The hydraulic cooling pump 60 in the illustrated construction is a fixed displacement one rotation pump, but may have another configuration in other implementations. For example, the displacement may be about 3.16 cubic inches (51.83 cubic centimeters), but may be higher or lower in other implementations.

Figure 5:
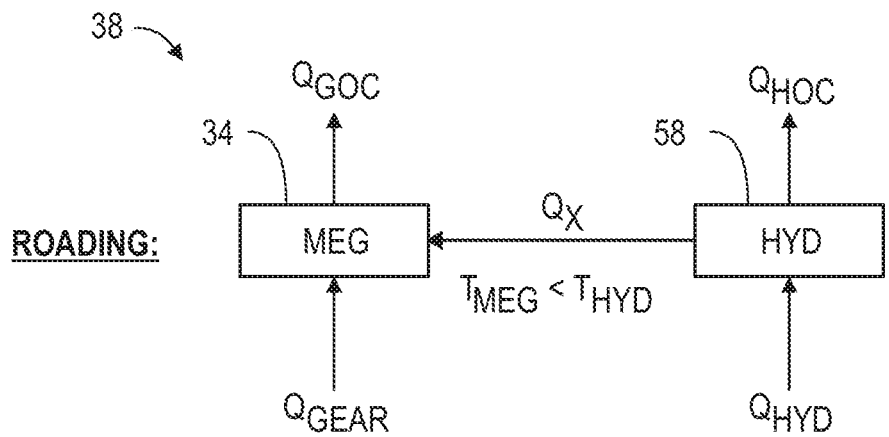
FIG. 5 is a schematic heat transfer diagram of the cooling system of FIG. 2 during roading.

The hydraulic cooler 62 is disposed downstream of the hydraulic cooling pump 60 before the hydraulic reservoir 58. The hydraulic cooler 62 is an oil-to-air cooler in the illustrated implementation but may be another type of cooler in other implementations. Specifically, the hydraulic cooler 62 is a heat exchanger containing oil that is cooled by external airflow from the fan 52 (FIG. 5). In other implementations, the hydraulic cooler 62 may be cooled by a different airflow from a different fan. In yet other implementations, the hydraulic cooler 62 may be a different type of heat exchanger. The hydraulic cooler 62 is configured to return cooled coolant to the hydraulic reservoir 58. Thus, the hydraulic cooling circuit 42 is configured to cool the coolant in the hydraulic reservoir 58 and thus cool the hydraulic system 36.

The hydraulic system 36 may include a transmission 66, such as a multi-motor transmission (MMT), disposed in fluid communication with the hydraulic cooling circuit 42. The transmission 66 may have first, second, and third motors 68a, 68b, 68c respectively, as in the illustrated implementation. However, in other implementations the transmission may have one motor, two motors, four or more motors, or any suitable number of motors. The motors 68a, 68b, 68c may be variable displacement two rotation direction motors, as illustrated, or other types of motors in other implementations. One of the motors, such as the first motor 68a, may be part of the hydraulic cooling circuit 42, disposed downstream of the hydraulic cooling pump 60 before the hydraulic cooler 62, as illustrated. The hydraulic system 36 also includes a hydraulic pump 70 arrangement and a closed reservoir 72. The closed reservoir 72 is in fluid communication with the motors 68a, 68b, 68c. The hydraulic pump arrangement 70 also provides the coolant to the hydraulic reservoir 58.

The crossover circuit 44 includes the hydraulic reservoir 58, the main engine gearbox 34, and a crossover pump 74 (which may also be referred to as a proportionator), all fluidly coupled in a continuous loop by way of a series of conduits 76. The crossover circuit 44 may also include the hydraulic pump arrangement 70 with the closed reservoir 72 disposed fluidly downstream of the crossover pump 74 before the hydraulic reservoir 58 for providing coolant to the hydraulic reservoir 58. The crossover pump 74 is disposed downstream of the main engine gearbox 34 and configured to draw coolant from the main engine gearbox 34 in parallel with the gearbox cooling pump 46. The crossover pump 74 may have a flow capacity of up to about 9 gallons per minute (32 liters per minute), but may be higher or lower in other implementations. The crossover pump 74 in the illustrated construction is a fixed displacement one rotation pump, but may have another configuration in other implementations. For example, the displacement may be about 0.83 cubic inches (13.52 cubic centimeters), but may be higher or lower in other implementations. The crossover pump 74 provides coolant from the main engine gearbox 34 to the hydraulic pump arrangement 70 and, ultimately, to the hydraulic reservoir 58. The hydraulic reservoir 58 is configured to mix coolant from the main engine gearbox 34 and hydraulic pump arrangement 70 with coolant from the hydraulic cooler 62. The hydraulic reservoir 58 is, in turn, configured to provide overflow coolant to the main engine gearbox 34 in a cascading fashion, e.g., at about 9 gallons per minute (32 liters per minute) or other suitable flow rate.

Figure 3:
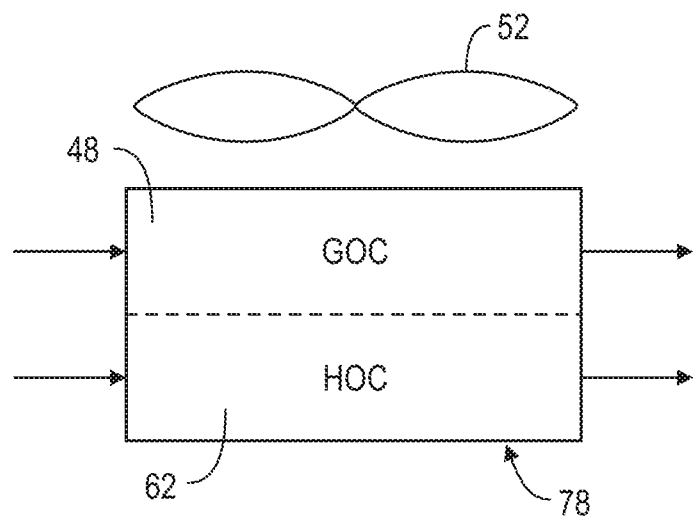
FIG. 3 is a schematic illustration of a combination cooler of the cooling system of FIG. 2.

As illustrated in FIG. 3, the gearbox cooler 48 and the hydraulic cooler 62 may be configured into a single unit, e.g., a combination cooler 78. The combination cooler 78 is a single heat exchanger having separate flow paths for the gearbox cooler 48 and the hydraulic cooler 62. For example, the gearbox cooler 48 may have about 7 tubes and the hydraulic cooler 62 may have about 15 tubes, though other suitable quantities and proportions of tubes may be employed for a given system. The combination cooler 78 is in a heat exchange relationship with a shared cooling fluid, such as the airflow from the fan 52, providing cooling to both the gearbox cooler 48 and the hydraulic cooler 62. The combination cooler 78 together with the crossover flow (crossover circuit 44) described above creates a more stable cooling system having a self-regulating temperature capability. The combination cooler 78 is approximately sized to meet the average heat rejection demand of the total cooling system (with some acceptable margin to achieve acceptable cooling of all the components), but then allow the crossover flow to regulate the temperature on both sides (e.g., on the gearbox cooling circuit 40 side and the hydraulic cooling circuit 42 side) to inhibit component overheating and better utilize cooling system heat rejection capability. In other implementations, the gearbox cooler 48 and the hydraulic cooler 62 need not be formed as a single unit. The gearbox cooler 48 and the hydraulic cooler 62 may be separate heat exchangers and still share the same cooling fluid, and in other implementations may employ separate cooling fluids. In any case, the gearbox cooler 48 and the hydraulic cooler 62 are arranged in parallel to reject heat from the main engine gearbox 34 and the hydraulic reservoir 58.

Figure 4:
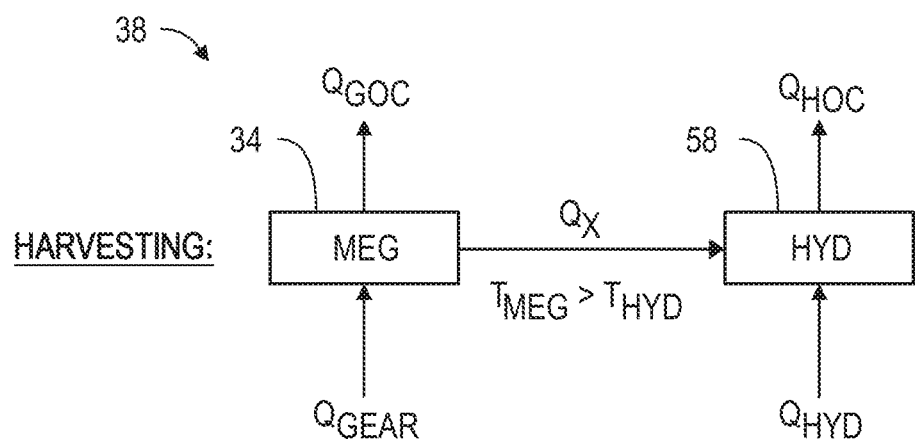
FIG. 4 is a schematic heat transfer diagram of the cooling system of FIG. 2 during harvesting.

In operation, the main engine gearbox 34 and the hydraulic system 36 generate heat, and the cooling system 38 moves the heat. FIG. 4 illustrates the heat transfer within the cooling system 38 during a harvesting operation or other operation (e.g., in an implement mode while the implement 14, such as the separator 18, is activated). As illustrated, heat (Qgear) is absorbed by the coolant in the main engine gearbox 34, which accumulates in the gearbox reservoir 56. When the temperature of the main engine gearbox coolant (Tmeg) is greater than the temperature of the hydraulic reservoir coolant (Thyd), then a portion of the main engine gearbox heat (Qx) is transferred to the hydraulic reservoir 58 and another portion of the main engine gearbox heat (Qgoc) is transferred to the cooling air by way of the gearbox cooler 48. While harvesting, the gearbox cooling (Qgoc) will be relatively high while propulsion/hydraulic cooling (Qhoc) relatively low. In this case, the main engine gearbox reservoir coolant temperature (Tmeg) rises, while the hydraulic reservoir temperature (Thyd) is typically relatively lower in temperature. Consequently, the cross-over coolant flow (described above) between the gearbox reservoir 56 and the hydraulic reservoir 58 transfers heat from the higher temperature to the lower temperature reservoir. This facilitates the balancing of reservoir temperatures. In the implement mode, this means the main engine gearbox temperature (Tmeg) will be moderated (inhibiting overheating in the gearbox cooling circuit 40) even though the gearbox cooler 48 may not be able to fully reject all the heat load on this side of the cooling system 38. Conversely, because heat is being transferred into the hydraulic reservoir 58, the temperature there will rise thus allowing the hydraulic cooler 62 to reject more heat to the cooling air. Thus, both the gearbox cooler 48 and the hydraulic cooler 62 are configured to cool the main engine gearbox 34 when the temperature of the main engine gearbox coolant (Tmeg) is higher than the temperature of the hydraulic reservoir coolant (Thyd).

FIG. 5 illustrates the heat transfer within the cooling system 38 during roading when the implement 14 is not activated (e.g., during transport of the vehicle 12 in a transport mode). As illustrated, heat (Qhyd) is absorbed by the coolant in the hydraulic reservoir 58. When the temperature of the main engine gearbox coolant (Tmeg) is less than the temperature of the hydraulic reservoir coolant (Thyd), then a portion of the hydraulic reservoir heat (Qx) is transferred to the main engine gearbox 34 by way of the crossover circuit 44 and another portion of the hydraulic reservoir heat (Qhoc) is transferred to the cooling air by way of the hydraulic cooler 62. During transport (implement off), the gearbox cooling (Qgoc) may drop significantly. But, propulsion load (e.g., at 25 mph (40 kph)) may be very high thus demanding higher hydraulic/propulsion cooling. In this case, the hydraulic reservoir temperature (Thyd) is typically higher than the main engine gearbox reservoir temperature (Tmeg). Consequently, the crossover coolant flow carries heat from the hydraulic reservoir 58 to the main engine gearbox reservoir 56. This enables the gearbox cooler 48 to reject more heat (Qgoc) to the cooling air. Thus, both the gearbox cooler 48 and the hydraulic cooler 62 are configured to cool the hydraulic system 36 when the temperature of the hydraulic reservoir coolant (Thyd) is higher than the temperature of the main engine gearbox coolant (Tmeg).

Thus, the main engine gearbox 34 and the rotor drive gearbox 54 are cooled directly by the gearbox cooler 48 and in parallel with the hydraulic cooler 62. Furthermore, the hydraulic system 36 is cooled directly by the hydraulic cooler 62 and in parallel with the gearbox cooler 48. If one side of the cooling system 38 receives more heat than can be dissipated by its respective cooler, then the excess heat from that side will flow to the other side by the mixing of the overflowing coolant. In this way, the cooling system 38 can automatically balance heat rejection and inhibit overheating of individual components. The combination cooler 78 provides the benefit of the one large oil cooler concept with the ability to provide superior temperature control of gearboxes and hydraulics.

Thus, the disclosure provides, among other things, a cooling system 38 having continuous crossover coolant flow to automatically balance heat rejection between individual cooling circuits and inhibit overheating of individual components. Various features and advantages of the invention are set forth in the following claims.

What is claimed is:
1. A vehicle comprising:
a frame;
at least one traction device coupled to the frame for facilitating movement of the vehicle;
an implement coupled to the frame and configured to perform a work operation;
a gearbox;
a hydraulic system having a hydraulic reservoir; and
an oil cooling system configured to cool the gearbox and the hydraulic system, the oil cooling system including:
a first circuit for a cooling oil, the first circuit including the gearbox and a first oil-to-air cooler configured to cool the cooling oil from the gearbox;
a second circuit for the cooling oil, the second circuit including the hydraulic reservoir and a second oil-to-air cooler for cooling the cooling oil from the hydraulic reservoir; and
a crossover circuit including the gearbox and the hydraulic reservoir, the crossover circuit configured to exchange the cooling oil between the gearbox and the hydraulic reservoir to provide heat transfer between the first and second circuits.

2. The vehicle of claim 1, wherein the oil cooling system further comprises:
a first pump in the first circuit configured to move the cooling oil between the gearbox and the first oil-to-air cooler; and
a second pump in the second circuit configured to move the cooling oil between the hydraulic reservoir and the second oil-to-air cooler.

3. The vehicle of claim 2, wherein the oil cooling system further comprises a third pump configured to move the cooling oil in the crossover circuit.

4. The vehicle of claim 3, wherein the third pump is configured to draw the cooling oil from the gearbox, and wherein the hydraulic reservoir is configured to direct overflow cooling oil to the gearbox.

5. The vehicle of claim 1, wherein the oil cooling system further comprises a pump in the crossover circuit configured to continuously move the cooling oil for continuous exchanging of heat between the first and second circuits.

6. The vehicle of claim 1, wherein the oil cooling system further comprises a rotor drive gearbox disposed fluidly between the first oil-to-air cooler and the gearbox, wherein the rotor drive gearbox is configured to be cooled by the cooling oil in the first circuit.

7. The vehicle of claim 1, wherein the first and second oil-to-air coolers are in communication with a common air source.

8. A cooling system for a vehicle, the vehicle including a gearbox and a hydraulic system, the cooling system comprising:
- a first circuit for a coolant configured to cool the gearbox, the first circuit including the gearbox and a first cooler configured to cool the coolant from the gearbox;
- a second circuit for the coolant configured to cool the hydraulic system, the second circuit including a hydraulic reservoir for the hydraulic system and a second cooler configured to cool the coolant from the hydraulic reservoir; and
- a crossover circuit including the gearbox and the hydraulic reservoir, the crossover circuit configured to exchange the coolant between the gearbox and the hydraulic reservoir to provide heat transfer between the first and second circuits.

9. The cooling system of claim 8, wherein the first and second coolers are air-cooled.

10. The cooling system of claim 8, wherein the coolant is oil, and wherein the oil is also configured to lubricate the gearbox.

11. The cooling system of claim 8, wherein the cooling system further comprises:
- a first pump in the first circuit configured to move the coolant between the gearbox and the first cooler; and
- a second pump in the second circuit configured to move the coolant between the hydraulic reservoir and the second cooler.

12. Cooling system of claim 11, wherein the cooling system further comprises a third pump configured to move the coolant in the crossover circuit.

13. The cooling system of claim 12, wherein the third pump is configured to draw the coolant from the gearbox, and wherein the hydraulic reservoir is configured to direct overflow coolant to the gearbox.

14. The cooling system of claim 8, wherein the cooling system further comprises a pump in the crossover circuit configured to continuously move the coolant for a continuous exchange of heat between the first and second circuits.

15. The cooling system of claim 8, wherein the cooling system further comprises a rotor drive gearbox disposed fluidly between the first cooler and the gearbox, wherein the rotor drive gearbox is configured to be cooled by the coolant from the first circuit.

16. The cooling system of claim 8, wherein the first and second coolers are both air-cooled and both in communication with a common air source.

* * * * *